Feb. 12, 1924.

H. R. HAMMETT

LIQUID METER

Filed April 29, 1922

1,483,225

Inventor
HARRY RICE HAMMETT
Lyon & Lyon
Attorneys

Patented Feb. 12, 1924.

1,483,225

UNITED STATES PATENT OFFICE.

HARRY RICE HAMMETT, OF BAKERSFIELD, CALIFORNIA.

LIQUID METER.

Application filed April 29, 1922. Serial No. 557,277.

*To all whom it may concern:*

Be it known that I, HARRY RICE HAMMETT, a citizen of the United States, residing at Bakersfield, in the county of Kern and State of California, have invented a new and useful Liquid Meter, of which the following is a specification.

This invention relates to a meter of the type employed in measuring liquids, and it is especially serviceable in measuring oil as it flows or is being pumped from the wells to the containers.

An object of the invention is to provide a meter in which the pressure of gas entrapped therein will prevent immersion of the bearings of the propeller shaft in the metered liquid, thus making it possible to avoid such variable operation as would result if the liquid were in contact with the bearing.

Another object is to produce a construction of stationary vanes which is economical.

Another object is to provide for ease of removal of the meter mechanism from the casing without removal of the casing from the pipe line in which it is installed.

Other objects and advantages will appear in the subjoined detailed description.

The accompanying drawings illustrate the invention:

Figure 7:
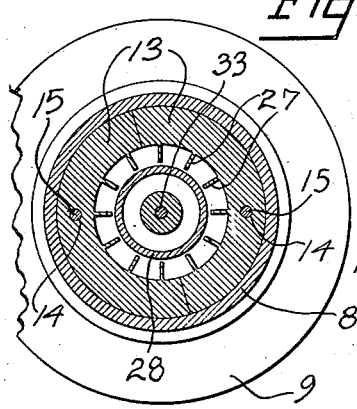
Figure 2:
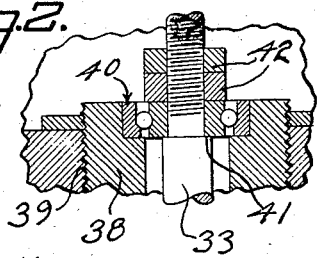
Fig. 2 is an enlarged sectional detail of the upper bearing.
Figure 1:
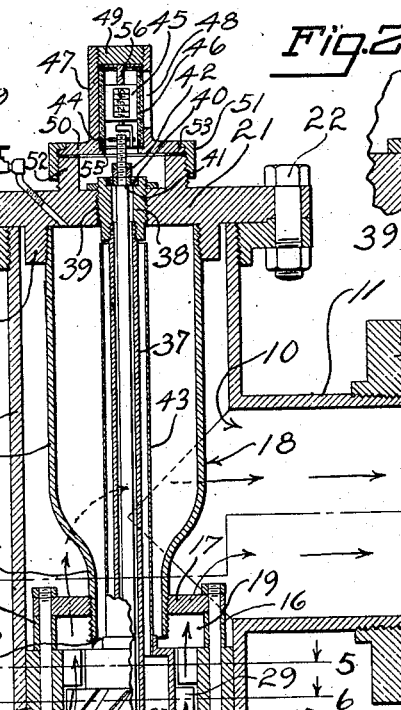
Figure 1 is a vertical mid-section of a meter constructed in accordance with the provisions of this invention.
Figure 6:
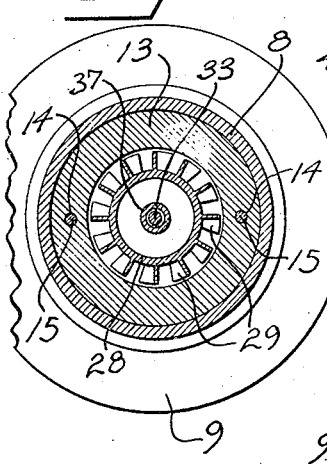
Figure 3:
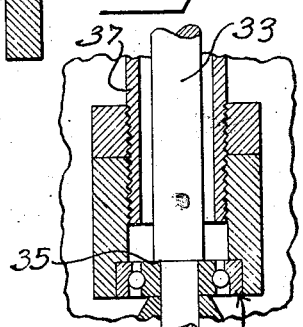
Fig. 3 is an enlarged sectional detail of the lower bearing.
Figure 4:
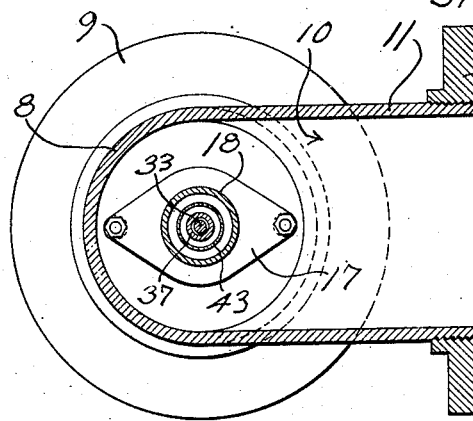
Figure 5:
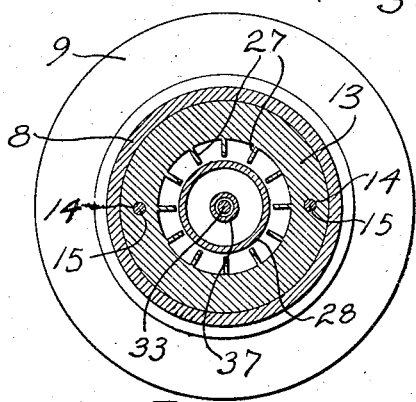

Figs. 4, 5, 6 and 7 are plan sections on the lines indicated by 4—4, 5—5, 6—6 and 7—7, respectively, Figure 1, portions of the lower flange being broken away in Figures 6 and 7, to contract the views.

There is provided a vertical tubular casing 8 having a flange 9 at its lower end for connecting with the pipe through which the liquid to be metered is inducted to the meter. The casing 8 is provided at one side with an outlet 10 which communicates with the bore of a tube 11 that, in this instance, is integral with the casing 8. The outer end of the tube 11 is provided with a flange 12 by which said tube may be connected with a pipe for carrying the liquid away from the meter to a suitable container, not shown.

The lower end of the casing 8 is open to form an inlet 54.

Fitting inside of the lower portion of the casing 8 is a stationary sectional vane support comprising sections 13, there being four such sections in this instance. The two end supports 13 may be made integral, but the intermediate ones are split so that they may be assembled as will appear hereinafter. The supports 13 are in the form of rings and are perforated at opposite sides thereof as indicated at 14 to receive bolts 15 which also extend through spacers 16 mounted on the uppermost vane support. The bolts 15 also extend through a flange 17 of a swaged vertical tube 18. In this instance the flange 17 is screw-threaded upon the tube 18. There are thus provided outlet spaces 19 from the bore of the vane support between the uppermost vane support 13 and the flange 17 to the space above the vane support.

The tube 18 is screw-threaded or otherwise secured within a downwardly projecting annular flange 20 of a head 21 which seals the upper ends of the tube 18 and casing 8, being secured by bolts 22 to an upper flange 23 of the casing 8. The tube 18 has a longer portion 24 of larger diameter and a shorter portion 25 of reduced diameter and forms with the head 21 a gas trap. The tube 18 is open at its lower end to form the gas inlet 26.

The support sections 13 are provided with inwardly projecting spaced vertical vanes 27, the vanes being considerably narrower than the rings 13 so as to space the series of vanes of adjacent rings from each other. Within the rings 13 is a rotor shell 28 provided with outwardly projecting spiral propeller vanes 29, there being a number of horizontal series of said vanes and each series being positioned in a horizontal plane between the horizontal planes occupied by the adjacent series of stationary vanes 27. The stationary vanes 27 prevent rotation or swirling of the column of liquid actuating the rotor. The rotor shell 28 is sealed near its lower end by an internal flange 30 and a plug 31 screw-threaded through said flange. The plug 31 is provided with a hole 32 through which projects a shaft 33. The shaft 33 is journaled just above the plug 31 in a combined radial and thrust bearing 34 and is provided with a shoulder 35 just above the bearing 34, there being a nut 36 screw-threaded on to the lower end of the shaft 33 to hold the bearing, shaft and plug assembled.

The bearing 34 is mounted on the lower end of a tube 37 which surrounds the shaft 33 and which is connected by a tubular coupling 38 to the head 21, said coupling being screw-threaded through a hole 39 at the axis of the head. The shaft 33 projects through the coupling 38 and is journaled in an upper combined radial and thrust bearing 40 mounted in the upper end of the coupling 38. The shaft 33 is provided with a shoulder 41 and a nut or nuts 42 on the shaft holds the shaft and bearing assembled.

The rotor shell 28 has a portion 43 of reduced diameter surrounding that portion of the tube 37 within the tube 18 and extending to within a slight distance of the coupling 38. The lower end of the tube 18 is below the level of the upper open end of the shell 28. The rotor shell, in this particular instance, is constructed of two sections, the portion 43, forming one section, being a force fit within, or being otherwise connected to, the other shell section.

The upper end of the shaft 33 carries a radially projecting pin 44 adapted to engage and actuate meter registering mechanism 45 which need not be described in detail herein, as the specific construction thereof is not a part of this present invention and as such mechanism is well understood in the art pertaining to meters. The meter registering mechanism 45 is enclosed in a glass tube 46 which is mounted in the bore of a tubular case 47 provided with an opening 48 to permit of reading the registered amount of liquid passed through the meter. The tube 46 rests on an internal shoulder 55 of the case 47 and its upper end is below the upper end of the case. Resting on the upper end of the tube 46 is a flanged support 56 for the registering mechanism 45. The upper end of the case 47 is closed by a plug 49 which engages the support 56. The case 47 has a flange 50 which is secured by a clamping ring 51 to an annular upwardly projecting flange 52 of the head 21, the shaft 33 projecting through the flange 52 into the tube 46. Preferably a gasket 53 will be placed between the flange 52 and the flange 50 to insure against leakage of gas that might otherwise escape from the interior of the tube 24. The plug 49 prevents leakage of gas through the meter-recording mechanism to the atmosphere. It is essential that a sufficient gas volume be maintained in the tube 18 to prevent rise of the liquid in the meter to the level of the upper end of the shell portion 43 so that the liquid cannot enter the shell and reach the lower bearing 34.

The present practice in measuring the production of oil wells is to employ gauge tanks and this requires a great deal of labor and also the first cost and upkeep of such gauge tanks is a considerable item of expense that can be eliminated by the use of this meter. This meter can be used in an oil pipe line under pressure or arranged to discharge by gravity into a flow tank. The latter would be the most satisfactory when the hilly nature of the location permits the flow tank to discharge by gravity to the stock tanks. In flat territory the well pump can pump through the meter direct to the stock tank, thus eliminating pumping from gauge tanks to the stock tanks.

When metering oil, the greater part of the gas coming from the well with the oil, must be removed before metering. This can be effected through by-passing the gas around the meter or else by using a simple gas trap. This meter is especially serviceable in connection with oil wells for obtaining a check on the production of individual wells.

Assuming that the meter casing 8 is connected in an oil pipe line, the meter operates as follows:

The oil flows upwardly between the vanes 27 and 29. thus acting on the vanes 29 to produce rotation of the shell 28 and operation of the registering mechanism 45 in a manner well understood in this art. There will, of course, be some gas in the oil, even though the greater portion thereof has been removed, and this gas will rise into the tube 24 through the intake 26 and said gas will also flow into the shell through the open upper end thereof. The shell being sealed near its lower end prevents the discharge of gas from the shell and also prevents the entrance of the oil into the shell. The gas in the tube 24 will prevent rise of the oil in the tube 24 to the level of the upper end of the rotor shell, thus keeping the oil from the bearing 34. Thus the bearing 34 will be maintained in such condition as to prevent change of the frictional component of the rotating parts of the meter, which change would make the meter unreliable in recording the amount of liquid flowing therethrough.

A meter of this type has already been employed by me, having a capacity of from 125 to 2500 barrels of oil in 24 hours on a 6" pipe line.

By the construction of the stationary vanes and their mounting as described above, when necessary to repair the meter mechanism, the bolts 22 may be removed, whereupon the parts suspended from the head 21 may be withdrawn therewith from the casing 8 without disconnecting the meter from the pipe line.

The two intermediate rings 13 are made sectional, as indicated in Figure 7, in order that they may be assembled in place around the rotor, since the vanes 29 of the rotor would interfere with movement of said rings 13 endwise into position between the end rings 13.

In the above described operation of the meter, oil is the liquid measured, but it is to be understood that water or any other liquid can also be measured by the meter. The term gas employed in this specification also defines air. If, for example, water is being run through the meter, an air pocket will be formed around the bearings to protect them from the water. If the meter is operating on a line in which the liquid pressure is relatively high, additional gas or air may be supplied to the tube 18 through the pipe 58 having a valve 59.

I claim:

1. In a meter, the combination of a casing having an inlet and an outlet, a head on the upper end of the casing, a vertical shaft journaled in the head and projecting therethrough, registering mechanism mounted on the head and operated by the shaft, a tube connected with the head and surrounding the shaft and provided at its lower end with a bearing for the shaft, the shaft extending through said bearing, a rotor shell having propeller vanes and secured to the shaft below the bearing, said shell being sealed below the level of the lower bearing and being open at its upper end, and a tube surrounding the upper portion of the shell and sealed at its upper end, the lower end of the last tube being open and being below the level of the upper end of the shell.

2. In a meter, the combination of a casing having an inlet and an outlet, upper and lower bearings connected with the casing, a shaft mounted in said bearings, propeller means in the casing associated with the shaft, means to form a gas pocket around the lower bearing, said pocket being closed below the lower bearing, and registering mechanism operated by the shaft.

3. In a meter, the combination of a casing having an inlet and an outlet, upper and lower bearings connected with the casing, a shaft mounted in said bearings, propeller means in the casing associated with the shaft, means to form a gas pocket around the lower bearing, means enclosing the upper bearing and including a case having an opening, a glass closing the opening, registering mechanism in the case operated by the shaft, and means affording communication between the gas pocket and the upper bearing whereby any gas leaking through the upper bearing will be retained by the case.

4. In a meter, the combination of a casing having an inlet and an outlet, a removable head on the casing, a bearing supported by the head, a shaft projecting through said bearing, a tube surrounding the shaft and connected at its upper end with the head and having a bearing at its lower end for the shaft, the shaft extending through the second bearing, propeller means in the casing associated with the shaft, and registering mechanism operated by the shaft.

5. In a meter, the combination of a casing having an inlet and an outlet, a shaft rotatably connected with the casing, propeller means in the casing associated with the shaft, a vane support fitting in the casing and formed by a series of rings, said rings having internal vertical vanes, means to hold the rings against separation, and registering mechanism operated by the shaft.

6. In a meter, the combination of a casing having an inlet and an outlet, a removable head on the casing, a bearing supported by the head, a shaft projecting through said bearing, a tube surrounding the shaft and connected at its upper end with the head and having a bearing at its lower end for the shaft, the shaft extending through the second bearing, propeller means in the casing associated with the shaft, registering mechanism operated by the shaft, a stationary vane support surrounding the propeller means and having vertical vanes, and means connecting the vane support with the head.

7. In a meter, the combination of a casing having an inlet and an outlet, upper and lower bearings connected with the casing, a shaft mounted in said bearings, propeller means in the casing associated with the shaft, means to form a gas pocket around the lower bearing, means to admit gas to said pocket, and registering mechanism operated by the shaft.

Signed at Bakersfield, Calif., this 18th day of April 1922.

HARRY RICE HAMMETT.

Witnesses:
R. McDONALD,
F. S. WHEELER.